United States Patent [19]

Fischbeck et al.

[11] 4,382,263

[45] May 3, 1983

[54] METHOD FOR INK JET PRINTING WHERE THE PRINT RATE IS INCREASED BY SIMULTANEOUS MULTILINE PRINTING

[75] Inventors: Kenneth H. Fischbeck; Edward Forest, both of Dallas, Tex.

[73] Assignee: Xerox Corporation, Stamford, Conn.

[21] Appl. No.: 253,130

[22] Filed: Apr. 13, 1981

[51] Int. Cl.³ .............................................. G01D 15/16

[52] U.S. Cl. ................................. 346/1.1; 346/140 R

[58] Field of Search .................... 346/140 PD, 140 IJ, 346/75, 1.1; 358/286

[56] References Cited

U.S. PATENT DOCUMENTS

| | | | |
|---|---|---|---|
| 3,136,594 | 6/1964 | Ascoli | 346/1 |
| 3,737,914 | 6/1973 | Hertz | 346/140 X |
| 3,871,004 | 3/1975 | Rittberg | 346/75 |
| 4,314,282 | 2/1982 | Fischbeck et al. | 358/293 X |

*Primary Examiner*—Stafford D. Schreyer

*Attorney, Agent, or Firm*—Richard A. Tomlin

[57] ABSTRACT

Electrostatic deflection is used to provide multiline printing from a single pass in an oscillating bar ink jet printer.

6 Claims, 6 Drawing Figures

METHOD FOR INK JET PRINTING WHERE THE PRINT RATE IS INCREASED BY SIMULTANEOUS MULTILINE PRINTING

BACKGROUND OF THE INVENTION

The invention relates to an oscillating bar drop-on-demand ink jet printer. Specifically, the invention relates to a method for reducing the velocity requirement for the bar or, conversely, increasing the rate of printing for a given bar velocity. Electrostatic droplet deflection is utilized to provide more than a single row of droplets per pass, per nozzle, thus increasing the printing rate for the oscillating bar printer.

BRIEF DESCRIPTION OF THE DRAWING

The foregoing advantages and features of the present invention will be apparent from the following more particular description of preferred embodiments as illustrated in the accompanying drawing wherein.

DESCRIPTION OF THE PREFERRED EMBODIMENTS

Figure 1:
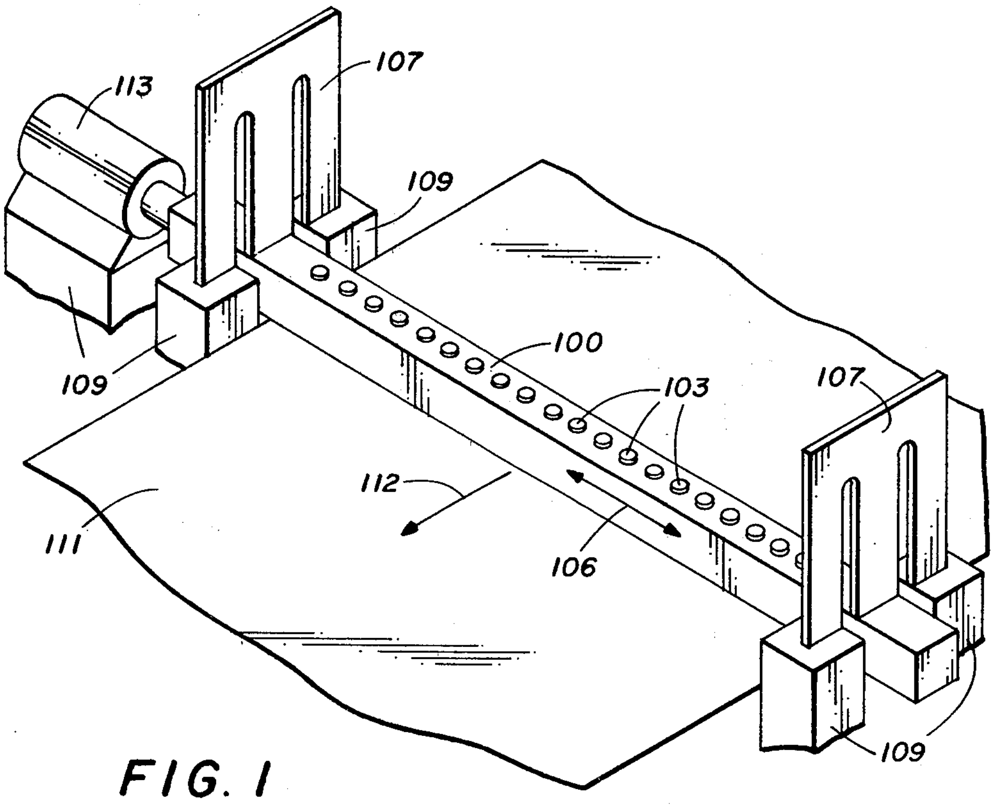
FIG. 1 is a perspective view of an oscillating bar printer in which the present invention is useful.

Referring now to FIG. 1, there is shown an oscillating bar printer. Specifically, there is shown a raster input scan/raster output scan (RIS/ROS) support member or bar 100, which may be, for example, of a plastic material. Supported by RIS/ROS support member 100 are scanning/reading means represented here by discs 103, which may be, by way of example, photodetectors. Also supported by RIS/ROS support member 100 are ink jets 105 (see FIG. 2), which, in this exemplary instance, are drop-on-demand ink jets. Conveniently, one ink jet 105 can be provided for each reading element 103; however, this is not necessary. RIS/ROS support member 100 is suspended for axial oscillatory movement in the directions shown by arrow 106 by flexure mounts 107, which act as multiple compounded cantilever springs. This double pivoting action keeps RIS/ROS support member 100 in spaced relationship to record-receiving member 111 with a minimum amount of arc over its complete travel. RIS/ROS support member 100 is oscillated by oscillating means 113, which may be, for example, a solenoid. Solenoid 113 is also fixed to base 109 as are flexure mounts 107.

Figure 2:
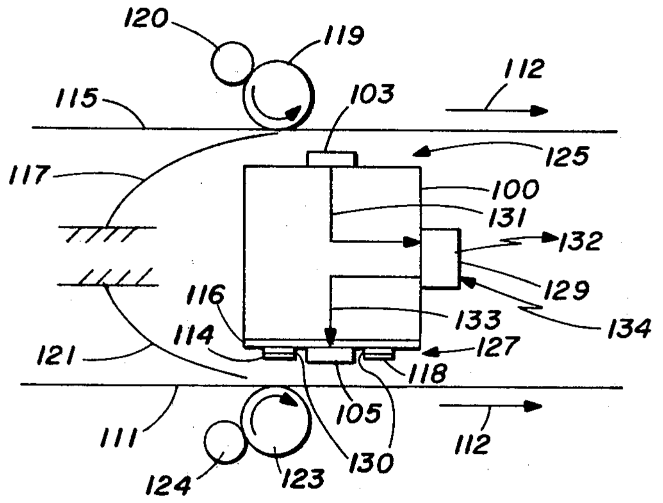
FIG. 2 is a side-sectional view of the oscillating bar printer of FIG. 1.

Referring now to FIG. 2, which is a schematic side view of the oscillating bar printer of FIG. 1 with the base 109 and flexure mounts 107 not shown for purposes of clarity. Document 115, which is to be scanned by photodetectors 103, is guided by leaf-spring fingers 117 into contact with drive guide roller means 119, which, when driven by document drive roller motor 120, pulls document 115 across the reading path of photodetectors 103 through image-reading station designated generally as 125. Document 115 and drive roller 119 were not shown in FIG. 1 to simplify understanding of the construction of the oscillating bar printer. Leaf-spring fingers 121 are used to guide record-receiving member 111, which may be, for example, paper, into contact with drive guide roller 123. Roller 123 driven by record member drive roller motor 124 guides and pulls record-receiving member 111 through the image-marking station designated generally as 127. Controller 129 is used to receive the input signal 131 from the photodetectors 103 and to produce an output signal 133 to ink jets 105. Transducer controller 129 is conveniently mounted on oscillating RIS/ROS support member 100.

Where the oscillating bar printer is used as a copier, a document 115 to be copied and a copy sheet 111 are fed into the nips formed by leaf-spring fingers 117 and drive roller 119 and leaf-spring fingers 121 and drive roller 123, respectively. Solenoid 113 is activated causing RIS/ROS support member 100 to vibrate or oscillate axially a distance approximately equal to the distance between photodetectors 103 to ensure that all areas of document 115 are read or scanned. Drive roller motors 120 and 124 are activated causing rotation of rollers 119 and 123 in such manner that document 115 and record-receiving member 111 are advanced at about the same speed or in synchronization. That is, the document and copy may be advanced together either continuously or stepwise. Preferably, the document 115 and copy sheet 111 are moved continuously because less expensive drive means and less circuitry are required than for stepwise movement. As document 115 is advanced, it is scanned by photodetectors 103, which send signals 131 to transducer controller 129. Transducer controller 129, in response to input signals 131, provides output signals 133, which trigger the appropriate ink jets 105. In this manner, a copy is formed on sheet 111 corresponding to the document 115. Obviously, signals 131 could be provided from a remote source, for example, facsimile or computer devices in which case photodetectors 103, document 115 and associated document feed apparatus would not be activated or required. The ink supply and power supply required to operate ink jets 105 are not shown, being conventional and well known in the art.

It can be seen that for a single pass of RIS/ROS support member, that is, when bar 100 moves from right to left or from left to right axially in a direction as shown by arrow 106, a single row of droplets is formed under ink jets 105 approximately parallel to the axis of support member 100. The rate at which printing occurs is, accordingly, dependent on how rapidly RIS/ROS support member 100 oscillates. Conventionally, support member 100 oscillates at a frequency between about 5 and 60 Hz. At the higher oscillation rates, drop placement becomes more sensitive to variation in drop ejection velocity. Drop placement errors can cause poor image quality. Further, higher oscillation rates cause higher support member 100 accelerations, which can create mechanical and timing problems. By means of the present invention, the printing rate can be increased for a given oscillation rate thereby reducing the need for higher oscillation rates. This printing rate increase is obtained by printing more than a single row of droplets for each pass of RIS/ROS support member 100. The method for accomplishing this is described in detail below.

Figure 3A:
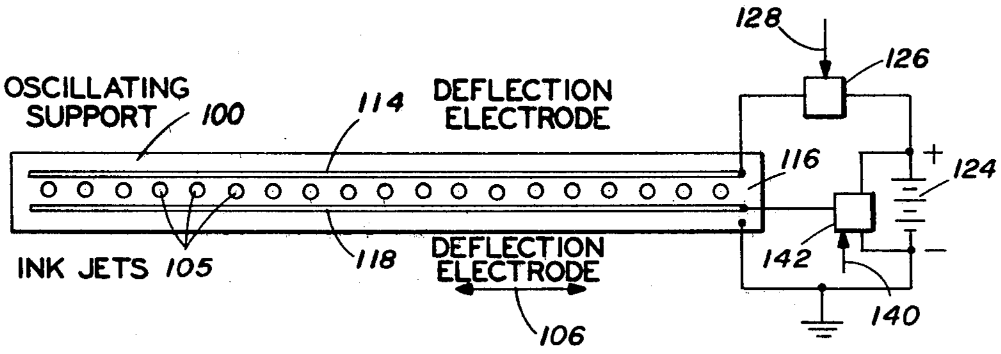
FIGS. 3A and 3B are views representing the ink jet nozzle and electrode arrangement for two different embodiments of the present invention.

Referring now to FIG. 3A, there is seen a bottom view of RIS/ROS support member 100 showing, greatly enlarged for purposes of explanation, ink jets 105 and deflection electrodes 114 and 118. Ink droplets are expelled through ink jet nozzles 105. Conductive faceplate 116 is formed on RIS/ROS support member 100. Electrostatic deflection electrode 114 and, if desired as explained later, auxiliary electrode 118 are mounted on RIS/ROS support member 100. The ink jets 105 and the electrodes 114 and 118 are aligned parallel to the direction 106 of oscillatory movement of RIS/ROS support bar 100. Insulating material 130 (see FIG. 2) is placed between the electrodes 114, 118 and the conductive faceplate 116. Electrode 114 is connected by electrical switch 126 to source of potential 124. In operation, when RIS/ROS support member 100 is moving to the right, as seen in FIG. 3A, droplets emitted from droplet ejector nozzle 105 follow a line of travel to the right. That is, the droplet has imparted to it the velocity of RIS/ROS support member 100 so that the droplet is displaced in a direction parallel to the direction 106 of axial oscillation of support member 100. When deflection controller signal 128 closes electrical switch 126, a potential difference is applied between electrode 114 and faceplate 116, which potential difference induces a charge in the conductive ink droplets causing their deflection in a direction normal to the direction represented by arrow 106 of the axial oscillation of RIS/ROS support member 100. In this case, the droplets would be deflected towards the positive electrode 114. It can be seen then that, by opening and closing switch 126, two rows of printing can be provided as represented in FIG. 4A.

Figure 4A:
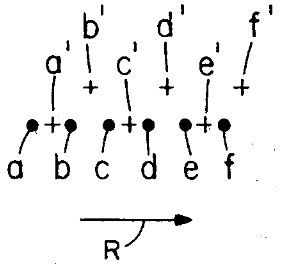
FIGS. 4A and 4B are schematic representations of the operation of the embodiments shown in FIGS. 3A and 3B, respectively.

Referring now to FIG. 4A, which schematically represents the operation of the embodiment of FIG. 3A. Again, assuming RIS/ROS support member 100 is moving in the direction represented by arrow R and that dot a represents the position of an ink jet nozzle 105 at the time of droplet ejection, the droplet would be thrown to the right, as seen in FIG. 4A, and land on the record surface in a location represented by cross a'. This would be the situation where switch 126 in FIG. 3A was open. Dot b represents the position of the same ink jet nozzle when the next droplet is or could be ejected. With switch 126 closed, the droplet lands on the record surface at a location represented by cross b', having been deflected toward the positive electrode. It can be seen, accordingly, that by alternately opening and closing switch 126, two rows of printing can be produced for each pass. At the ink jet nozzle positions represented by dots a, c and e, droplets are expressed without deflection, that is, with switch 126 open, forming a line of printing represented by crosses a', c' and e'. At the ink jet nozzle positions represented by dots b, d and f, droplets are expressed with switch 126 closed, causing droplets to be deflected to locations b', d' and f', respectively, those droplets providing a second line of printing. Whether a particular droplet is expressed or not at any of positions a–f depends on transducer controller signals 133. By having the transducers and the deflection electrodes triggered by a single clock signal, deflection controller signal 128 would close switch 126 on alternate clock signals; a very simple requirement. Note that the FIG. 3A embodiment wherein electrodes are positioned to deflect droplets normal to the direction oscillation of bar 100 provides a diamond shaped pattern preferred for many printing requirements. This is a result of the velocity induced droplet offset and the deflection induced droplet offset normal to the velocity induced offset. Auxiliary electrode 118 can be provided if desired to increase the amount of droplet deflection obtained using a given power supply 124. This result is obtained by applying a potential difference between both electrode 114 and faceplate 116 and electrode 118 and faceplate 116 during droplet formation. The effect of using both electrodes is to about double the charge induced in the droplets. Then, at the time of droplet ejection, auxiliary deflection electrode control signal 140 causes switch 142 to disconnect electrode 118 from the positive side of power supply 124 and to connect it to the negative side of power supply 124. This will provide droplet deflection again normal to the axis of bar 100 but stronger than that obtained without using auxiliary deflection electrode 118. It is obvious that by proper use of electrode 118, three rows of droplets could be formed; one row formed with no deflection electrodes, a second row using deflection electrode 114, and a third row using both deflection electrode 114 and auxiliary deflection electrode 118. Further, it is obvious that, by providing the switching characteristics to electrode 114 that are provided electrode 118 in the above example, two more rows of droplets could be provided on the auxiliary electrode 118 side of the bar, that is, by using electrode 118 as a positively biased deflecting electrode.

Figure 3B:
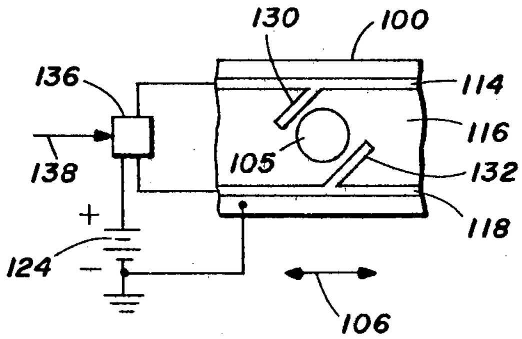

Referring now to FIG. 3B, there is seen a section of a RIS/ROS support member 100 supporting an ink jet nozzle 105/electrode 114, 118 arrangement for producing three rows or lines of printing for each pass of support member 100. Here electrodes 114 and 118 contain elements 130 and 132, respectively, which are positioned to deflect droplets at an oblique angle, for example, 45 degree angle to the direction of axial oscillation of support member 100. Other angles can obviously be used if desired.

Figure 4B:
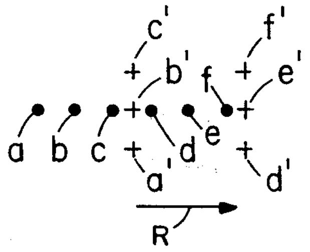

Referring now to FIGS. 3B and 4B, dot a represents the position of the ink jet nozzle 105 of FIG. 3B when a droplet is ejected. Switch 136 is in the position to connect deflection electrode 118 to the positive side of source of potential 124 shown in FIG. 3B, that is, a potential is applied between deflection electrode 118 and faceplate 116 with electrode 118 being made positive with respect to faceplate electrode 116. The droplet ends up on the record surface in a location represented by cross a'. The droplet has been deflected forward and down, as seen in FIG. 4B, by the influence of electrode segment 132. Dot b represents the position of ink jet nozzle 105 when the next droplet is expressed. At position b, deflection electrode switch controller 138 causes electrical switch 136 to disconnect potential source 124. Cross b' represents the location on the record member of the droplet expressed when the ink jet nozzle was in position b, and no deflection electrode potential was applied. Dot c represents the position of ink jet nozzle 105 when the next droplet is or could be expressed. At this point, deflection electrode controller signal 138 causes switch 136 further to connect electrode 114 to the positive side of potential source 124. With the support member moving to the right, as shown in the two Figures, and electrode segment 130 acting on the droplet, the droplet is deflected in a direction up and back as seen in FIG. 4B, which retards its forward motion causing the droplet to impact the record member surface (not shown) in a location represented by cross c'. Electrical switch 136 is then cycled back to its original position, and the sequence of switch movement and droplet ejection is repeated for dot positions d, e and f, resulting in droplet locations d', e' and f', respectively. It can be seen that droplet locations c', f' present one line of printing; b', e', a second line of printing; and a', d', a third line of printing. The embodiment of FIG. 3B, accordingly, can provide three lines of printing for each pass of RIS/ROS support member 100.

In either of the above cases, the same result will occur when RIS/ROS support member is moving from right to left on its return pass. In the case of the FIG. 4A operation, the switch is simply alternated to turn the electrodes on or off. In the FIG. 4B operation, the sequence would be first to make electrode segment 130 positive for the first droplet; both electrodes off, for the second droplet; and electrode segment 132 positive, for the third droplet. It should be noted that droplets are expressed only when required by input transducer controller signal 133 (see FIG. 2). This is independent of the operation of the electrodes, which may be sequenced, whether droplets are expressed or not. It is only necessary that the timing of the electrode activation correspond to droplet ejection so that the desired deflection is obtained.

Although specific components and embodiments have been disclosed herein, many modifications and variations will occur to those skilled in the art. For example, if the amount of electrical potential applied to the deflection electrodes in FIG. 3B was also increased or decreased at a given droplet ejection position, additional lines of printing could be obtained. Such modifications and variations are intended to be included within the scope of the appended claims.

What is claimed is:

1. A method for ink jet printing comprising:

(a) providing a support member having an axis and a plurality of drop-on-demand ink jets aligned parallel to said axis mounted on said support member for printing a first line on a record-receiving member;

(b) providing means for oscillating said support member in a printing direction parallel to said axis;

(c) providing means for electrostatically deflecting preselected single droplets ejected from said ink jets in a direction away from said axis, said preselected single droplets forming a second line of printing parallel to said first line; and (d) oscillating said support member while droplets are ejected from said ink jets and electrostatically deflecting at least a portion of said droplets in a direction away from said axis to form at least two lines of printing on a record-receiving member.

2. The method of claim 1 and further including at (a) the step of providing a raster input scanner on said support member, and providing the additional steps between step (b) and step (c) of scanning an original document to produce ink jet control signals and applying said ink jet control signals to said ink jets.

3. The method of claim 1 wherein said droplets are deflected away from said axis in one direction only.

4. The method of claim 3 wherein the amount of droplet deflection is varied.

5. The method of claim 1 wherein first portion of said droplets are deflected away from said axis in a first direction, and a second portion of said droplets is deflected away from said axis in a second direction.

6. The method of claim 5 wherein the amount of droplet deflection is varied.

* * * * *